March 9, 1954   D. BERLIN   2,671,669
COLLAPSIBLE CART
Filed Aug. 9, 1951
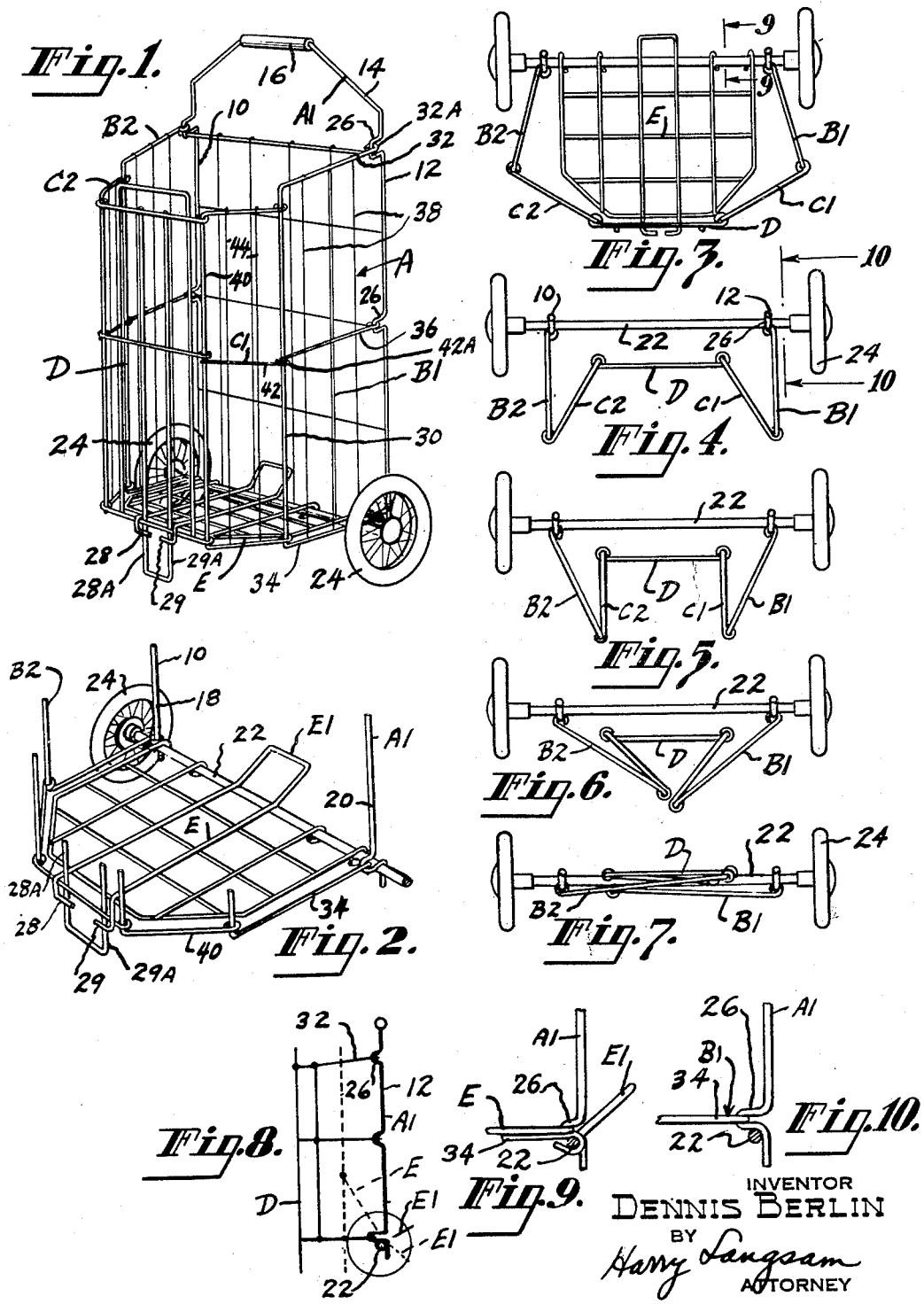
INVENTOR
DENNIS BERLIN
BY
Harry Langsam
ATTORNEY Patented Mar. 9, 1954

2,671,669

UNITED STATES PATENT OFFICE 2,617,669

COLLAPSIBLE CART

Dennis Berlin, Philadelphia, Pa.

Application August 9, 1951, Serial No. 241,049

5 Claims. (Cl. 280—36)

My invention relates to a collapsible cart and relates particularly to a collapsible cart wherein the cart may hold a greater volume of goods than the prior art carts without spilling the goods.

It is an object of my invention to provide deeper sides for a collapsible cart without increasing the overall weight of the cart whereby the overall capacity of the cart is increased over the prior art devices.

Another object of my invention is to provide a collapsible or folding shopping cart wherein a lever on the bottom member will result in the walls of the cart folding upon itself.

Another object of my invention is to provide a folding shopping cart wherein an extension on the pivoted bottom may open the walls of the cart or it may fold the walls of the cart.

Another object of my invention is to provide a collapsible cart with a combined handle and back wall brace.

Another object of my invention is to provide a collapsible folding cart with a rigid U-shaped handle frame that also serves as a portion of the rear wall.

Another object of my invention is to provide end pieces which will nestle the articulated side members and the front frame of a collapsible cart.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 is a perspective view of a collapsible cart embodying my invention.

Fig. 2 is a fragmentary perspective view of the bottom which is pivotally mounted upon the axle.

Fig. 3 is a plan view of the bottom.

Fig. 4 is a plan view showing the side frames in a closing position.

Fig. 5 is a view similar to Fig. 4 wherein the frames are further closed.

Fig. 6 is a view similar to Figs. 4 and 5 wherein the closing of the frame has further progressed.

Fig. 7 shows the side frames collapsed.

Fig. 8 is a single line side view of the cart and how the front frame is drawn to the rear frame.

Fig. 9 is a sectional view taken along the line 9—9 of Fig. 3.

Fig. 10 is a sectional view taken along the line 10—10 of Fig. 4.

Referring now in detail to the drawing wherein similar reference characters refer to similar parts I show, in Fig. 1 a collapsible cart embodying my invention.

The collapsible cart is utilized by the shopper who carries many small parcels as well as groceries as the result of shopping. The cart, when not in use, can easily be collapsed and stored, and is made available by stepping upon an extension integrally formed with the bottom support to lower the bottom and automatically open the sides. The cart is primarily composed of metallic rods joined together in accordance with my invention hereinafter further described.

As great strength and low weight are important considerations, my invention embodies a rear panel, generally designated as A, which comprises a U-shaped member A1, having parallel arms 10, 12 and a portion 14 joining the ends of the arms 10, 12. The joining portion 14 has a rubber tubing 16 thereon which serves as a handle. The ends 18, 20 are welded or otherwise rigidly fastened to a horizontally extending axle 22 upon which two rubber tire wheels 24 are held. Each of the arms 10, 12 has a plurality of small indentations 26 thereon which serve as connecting joints for articulated side panels, generally designated as B1 and B2. The indentations 26 face the front of the cart and they extend or project a short distance from the main portion of each arm 10, 12 for the purpose of nestling the other articulated sub-panels C1 and C2 and the front articulated panel D, as shown in Fig. 7, for providing a tightly collapsed cart.

When the bottom, generally designated as E, is elevated about the axle 22 as its pivot by pressing upon the externally projecting extension E1, hooks 28, 29 located at the forward end of the bottom ride against the vertical wires 28A, 29A of the front panel D thereby pulling the front panel in the direction of the rear panel A.

It should be noted in Figs. 4 to 7 that the indentations provide a pivot for the wire side panels B1, B2 so that the thickness of the panels B1, B2, the sub-panels C1, C2, and the front panel D are nestled within the rear frame A.

The side panel B1 comprises a U-shaped wire rod having a vertically extending middle portion 30 and arm portions 32, 34 integrally connected to the middle portion. The free end 32A of the arm 32 is looped about the indentation 26 to form a pivotal connection, and the free end of the arm 34 is similarly connected to an indentation. The arm 32 is inclined upwardly from the front of the cart.

A horizontally extending cross arm 36 forming part of the side panel B1 is welded in position to the U-shaped wire rod and its free end is swiveled to an indentation in the rear frame A1. A plurality of vertical metallic rods 38 forming vertical braces are welded to the arms 32, 34 and 36. It should be particularly observed that the arm 32 is inclined upwardly in the direction from the front panel D to the rear panel A, see Fig. 8. With this construction the arm 32 prevents articles in the upper portion of the cart from spilling when the cart is tilted during the period of time the articles are being transported in the cart. Furthermore, the inclining of the arm 32 enables the capacity of the cart to be materially increased.

The sub-panel C1 comprises a U-shaped rod 40 having loops at its free ends which encircle the rod portion 30 whereby articulation is effected between the sub-panel C1 and the side panel B1. A horizontally extending rod 42 is welded to the U-shaped rod 40 and the vertical extending reinforcing rods 44. However, an end 42A is looped around the rod 30 immediately adjacent the brace rod 36 in order to provide a rigid bracing support for the side panel C1.

It should be noted that side panels B1 and B2 are alike, and sub-panels C1 and C2 are alike.

The front panel B has a front support of wires 28, 29 which abut the ground whereby the collapsible cart may remain upright without any outside support.

This invention functions similarly to my previously filed patent applications Serial No. D13,660, filed January 3, 1951, now abandoned, and Serial No. 130,033, filed November 29, 1949. This application is a continuation in part, of my prior filed application, Serial No. 130,033, filed November 29, 1949.

Although my invention has been described in considerable detail, such description is intended as being illustrative rather than limiting, since the invention may be variously embodied, and the scope of the invention is to be determined as claimed.

I claim:

1. In a folding cart, a fixed rear frame having an integral inverted U-shaped end member, a handle attached to the middle portion of said U-shaped end member, an axle, the free ends of said U-shaped end member rigidly affixed to said axle, a plurality of sides and a front frame articulated together and to said rear frame, said front frame having a plurality of vertically extending wires, a bottom pivotally mounted to said axle, an extension on said bottom located rearwardly of said axle whereby said bottom may be oscillated about said axle as a pivot, a hook on said bottom engaging one of said vertically extending wires of said front frame whereby said front frame will be drawn toward said rear frame when the extension on said bottom is pressed downwardly elevating said bottom.

2. In a folding cart, a fixed rear frame having an integral inverted U-shaped end member, a handle attached to the middle portion of said U-shaped end member, an axle, the free ends of said U-shaped end member rigidly affixed to said axle, a plurality of sides and a front frame articulated together and to said rear frame, said front frame having a plurality of vertically extending wires, a bottom pivotally mounted to said axle, an extension on said bottom located rearwardly of said axle whereby said bottom may oscillate about said axle as a pivot, a hook on said bottom engaging one of said vertically extending wires of said front frame whereby said front frame will be drawn to said rear frame when the extension on said bottom is pressed downwardly thereby elevating said bottom and folding said front and side frames, a plurality of U-shaped indentations on said U-shaped end member, said side frames being pivotally attached to said inverted U-shaped indentations on said U-shaped end member whereby the articulated sides and front may be nestled by the swinging of the side frames about their pivotal connections toward said U-shaped end member.

3. In a folding cart, a fixed rear frame having an integral inverted U-shaped end member, a handle attached to the middle portion of said U-shaped end member, an axle, the free ends of said U-shaped end member rigidly affixed to said axle, a plurality of sides and a front frame articulated together and to said rear frame, said front frame having a plurality of vertical extending wires, a bottom pivotally mounted to said axle, an extension on said bottom located rearwardly of said axle whereby said bottom may be oscillated about said axle as a pivot, a hook on the front end of said bottom engaging one of said vertical extending wires of said front frame whereby said front frame will be drawn toward said rear frame when the extension on said bottom is pressed downwardly thereby elevating said bottom and folding the sides.

4. In a folding cart having a plurality of supporting wheels mounted upon an axle, a fixed rear frame having an integral inverted U-shaped end member, a handle attached to the middle portion of said U-shaped end member, the free ends of said U-shaped end member rigidly affixed to said axle, a plurality of sides and a front frame articulated together and to said side frame, said front frame having a plurality of vertically extending wires, a bottom pivotally mounted upon said axle, an extension on said bottom whereby said bottom may be oscillated about said axle on a pivot, a hook on said bottom adapted to engage one of said vertically extending wires of said front frame whereby said front frame will be drawn toward said rear frame when the extension on said bottom is moved to elevate said bottom and thereby folding said sides, bottom and rear frame together.

5. In a folding cart having a plurality of supporting wheels mounted upon an axle, a fixed rear frame having an integral inverted U-shaped end member, the free ends of said U-shaped end member rigidly affixed to said axle, a plurality of sides and a front frame articulated together and to said rear frame, said front frame having a plurality of vertically extending wires, a bottom pivotally mounted upon said axle, an extension on said bottom whereby said bottom may be oscillated about said axle as a pivot, a hook on said bottom adapted to engage one of said vertically extending wires of said front frame whereby said front frame will be drawn toward said rear frame when the extension on said bottom is moved to elevate said bottom, thereby folding said sides, bottom, and rear frame together.

DENNIS BERLIN.

References Cited in the file of this patent

UNITED STATES PATENTS

| Number | Name | Date |
| --- | --- | --- |
| 2,475,797 | Martin | July 12, 1949 |
| 2,483,958 | Yaszay et al. | Oct. 4, 1949 |